United States Patent [19]
Lew

[11] Patent Number: 5,109,704
[45] Date of Patent: * May 5, 1992

[54] VORTEX FLOWMETER WITH BALANCED VORTEX SENSOR

[76] Inventor: Hyok S. Lew, 7890 Oak St., Arvada, Colo. 80005

[*] Notice: The portion of the term of this patent subsequent to Jan. 22, 2008 has been disclaimed.

[21] Appl. No.: 584,105

[22] Filed: Sep. 19, 1990

Related U.S. Application Data

[63] Continuation-in-part of Ser. No. 412,793, Sep. 26, 1989, Pat. No. 4,986,134.

[51] Int. Cl.⁵ .................................................. G01F 1/32
[52] U.S. Cl. .................................................. 73/861.24
[58] Field of Search ........... 73/861.22, 861.24, 861.91, 73/861.92, 3, 861.03, 861.04

[56] References Cited

U.S. PATENT DOCUMENTS

| | | | |
|---|---|---|---|
| 1,935,445 | 11/1933 | Heinz | 73/861.24 |
| 4,069,708 | 1/1978 | Fussell, Jr. | 73/861.24 |
| 4,333,355 | 6/1982 | Dacus et al. | 73/861.91 |
| 4,986,134 | 1/1991 | Lew | 73/861.24 |

*Primary Examiner*—Herbert Goldstein

[57] ABSTRACT

A vortex flowmeter comprises a vortex generating bluff body (3) disposed across a flow passage (1) and a balanced vortex sensing planar member (4) disposed downstream of the bluff body (3) and supported pivotably about a pivot axis parallel to the central axis of the flow passage (1) and passing through a mid-section of the vortex sensing planar member, wherein a deflective portion (11) of the vortex sensing planar member (4) is connected to a transducer (15) that generates an alternating signal representing the vortex shedding from the bluff body (3).

20 Claims, 3 Drawing Sheets

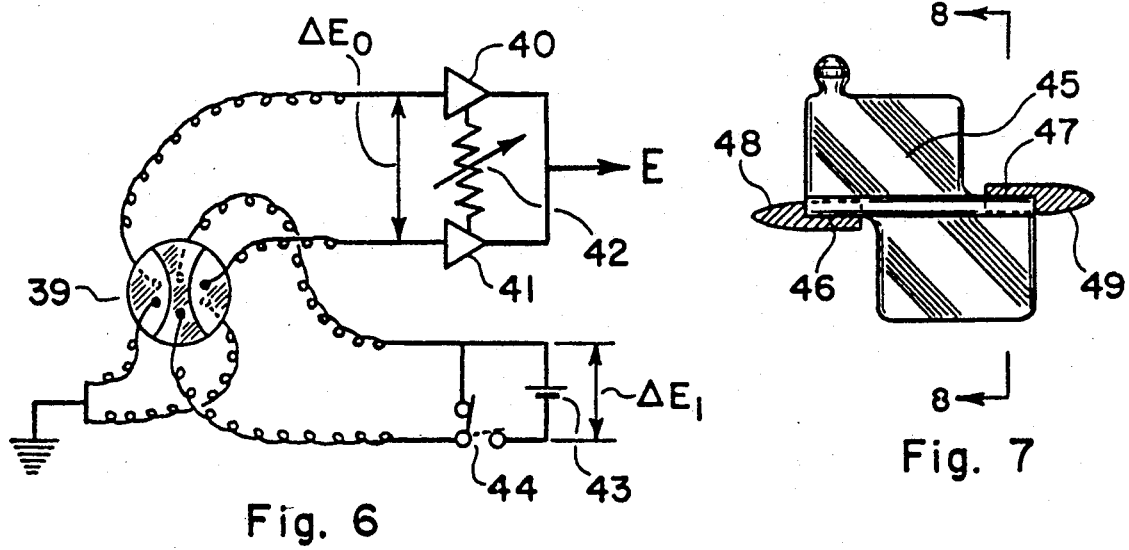
Fig. 6
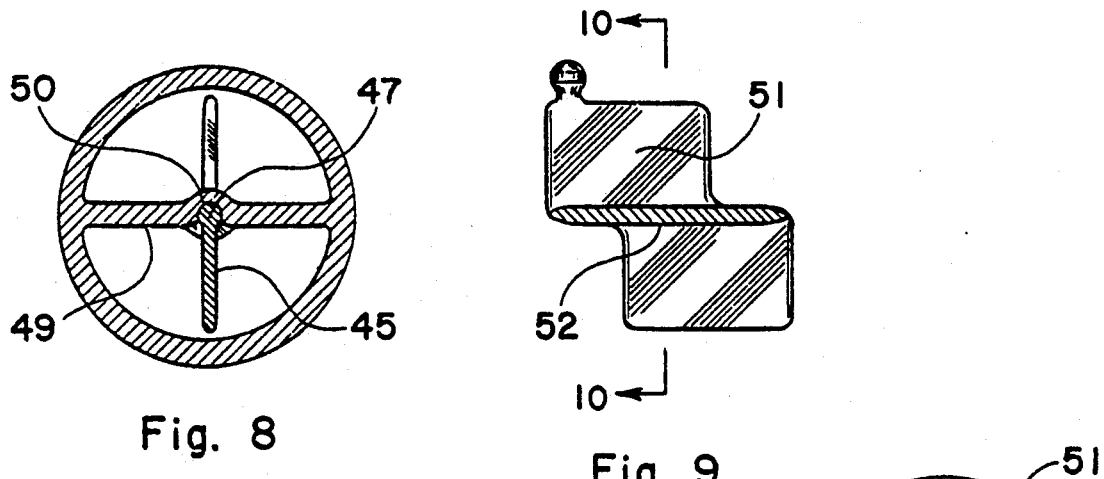
Fig. 7
Fig. 8
Fig. 9
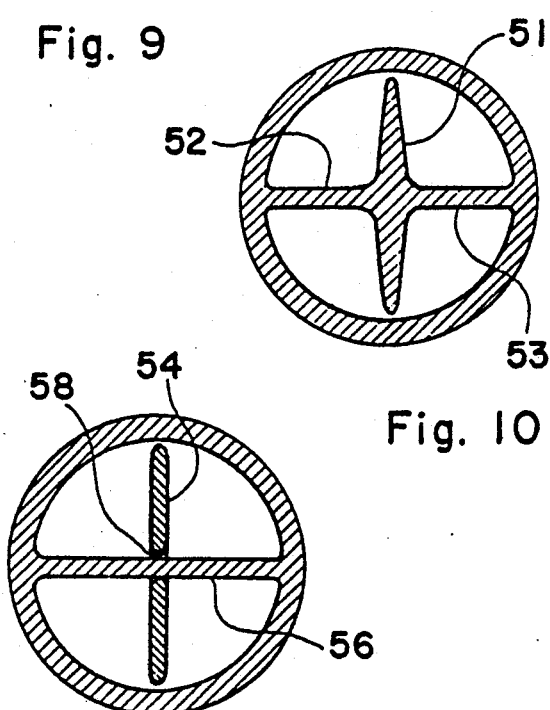
Fig. 10
Fig. 11
Fig. 12

VORTEX FLOWMETER WITH BALANCED VORTEX SENSOR

This patent application is a continuation-in-part to U.S. patent application Ser. No. 07/412,793 entitled "Vortex Flowmeter with Inertially Balanced Vortex Sensor" filed on Sep. 26, 1989, now U.S. Pat. No. 4,986,134.

The best of the vortex flowmeters available at the present time has a turn-down ratio (ratio of the maximum measurable velocity to the minimum measurable velocity) of 60 to 1 at best, while most of the commonly available vortex flowmeters have a turn-down ratio no better than 15 to 1. It is a well known fact that a bluff body of an elongated cylindrical shape disposed perpendicular to the fluid stream sheds a series of vortices from the two sides thereof in an alternating pattern at a frequency linearly proportional to the fluid velocity in a range of Reynolds number greater than 1,000 and less than 400,000, where the Reynolds number based on the bluff body width is a dimensionless flow characteristic number equal to the product of the fluid velocity and the bluff body width divided by the kinematic viscosity of the fluid. A well designed vortex flowmeter should have a turn-down ratio at least equal to 100 and close to 200-300 under ideal conditions. As the amplitude of the momentum fluctuation in the downstream of the bluff body as a result of vortex shedding is proportional to the dynamic pressure of the fluid flow, which is equal to one half of the fluid density times the square of the fluid velocity, the magnitude of the vortex induced momentum fluctuation becomes very small when the fluid velocity becomes very low, for example, a fraction of feet per second for water and a score of feet per second for air, and the typical vortex sensor measuring a vortex induced force as a measure of vortex shedding fails to detect the vortex induced force of very small amplitude as it becomes submerged under other vibratory forces such as the structural vibration of the flow conduit. A superior vortex sensor must have an extraordinary feature that makes the vortex sensor selectively detect the vortex induced force, while the noise generated by the structural vibrations are selectively rejected or cancelled out in the process of vortex measurement.

The primary object of the present invention is to provide a vortex flowmeter comprising a vortex generating bluff body of an elongated cylindrical shape disposed across a first cross section of a flow passage, and a vortex sensing planar member disposed across a second cross section of the flow passage parallel to the vortex generating bluff body on a plane parallel to the direction of the fluid flow, wherein the vortex sensing planar member is supported in an arrangement that allows at least a minute amount of pivoting movement thereof about a pivot axis parallel to the direction of the fluid flow, and the two halves of the planar vortex sensing member respectively located on the two opposite sides of the pivot axis are balanced about the pivot axis. Of course, a deflective portion such as one extremity of the vortex sensing planar member is connected to a transducer that converts the vortex induced force experienced by the vortex sensing planar member into an electrical signal representing the vortex shedding.

Another object is to provide a balanced vortex sensing planar member having the pivot axis disposed at a midsection thereof.

A further object is to provide a balanced vortex sensing planar member having the pivot axis disposed near one extremity thereof.

Yet another object is to provide a vortex flowmeter measuring the vortex shedding frequency as a measure of the volume flow rate of the fluid.

Yet a further object is to provide a vortex shedding flowmeter determining the mass flow rate of the fluid flow from a combination of the vortex shedding frequency and the amplitude of the fluid dynamic force associated with the vortex shedding.

These and other objects of the present invention will become clear as the description thereof progresses. The present invention may be described with a greater clarity and specificity by referring to the following figures:

FIG. 6 illustrates a further embodiment of a Piezo electric element employable in the transducer shown in FIG. 3, and signal conditioning and calibrating circuit.

FIG. 7 illustrates another embodiment of the balanced vortex sensor.

FIG. 8 illustrates a cross section of the embodiment shown in FIG. 7.

FIG. 9 illustrates a further embodiment of the balanced vortex sensor.

FIG. 10 illustrates a cross section of the embodiment shown in FIG. 9.

FIG. 11 illustrates yet another embodiment of the balanced vortex sensor.

FIG. 12 illustrates a cross section of the embodiment shown in FIG. 11.

Figure 1:
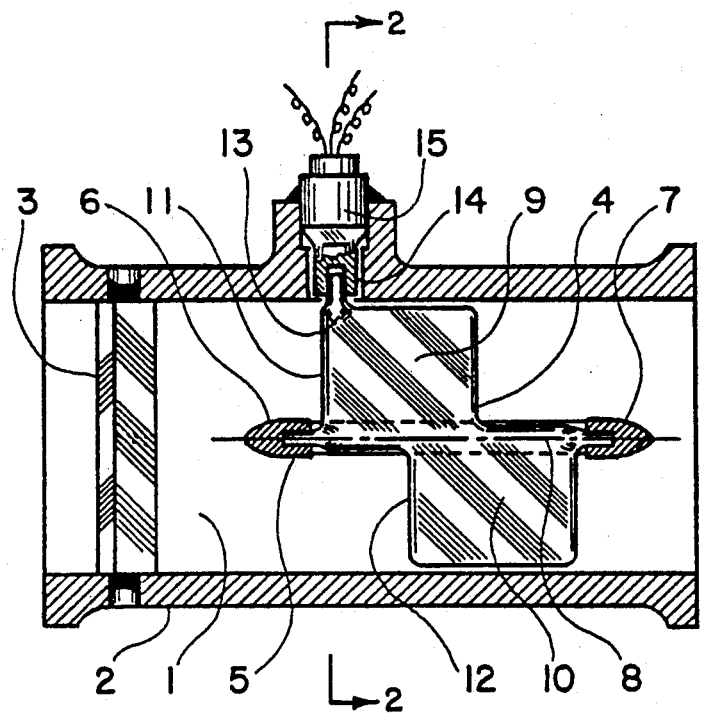
FIG. 1 illustrates a cross section of an embodiment of the vortex flowmeter with balanced vortex sensor.

In FIG. 1 there is illustrated a cross section of an embodiment of the vortex flowmeter employing a balanced vortex sensor. The vortex flowmeter comprises a flow passage 1 extending through the vortex flowmeter body 2, a vortex generating bluff body 3 of an elongated cylindrical shape disposed across a first cross section of the flow passage 1, and a vortex sensing planar member 4 disposed across a second cross section of the flow passage 1 parallel to the bluff body 3 on a plane generally parallel to the central axis of the flow passage 1. The midsection of the vortex sensing planar member 4 engages a slotted opening included in a planar supporting member 5 with a leading edge 6 and trailing edge 7, that is disposed perpendicular to the vortex sensing planar member 4 and anchored to the flowmeter body 2. The vortex sensing planar member 4 is supported by the planar supporting member 5 in an arrangement that allows a pivoting movement of the vortex sensing planar member 4 about a pivot axis 8 generally coinciding with the central axis of the flow passage 1 over at least a minute angle. The two extremities of the vortex sensing planar member 4 are not touching the wall of the flow passage 4. The mass distribution in the two halves 9 and 10 respectively located on the two opposite sides of the pivot axis 8 are balanced in such a way that the vibrations of the flowmeter body 2 in directions perpendicular to the central axis thereof produce little pivoting vibration of the vortex sensing planar member 4 about the pivot axis 8, which mass distribution may be accomplished balancing the mass itself about the pivot axis 8, or by balancing the moment of inertia about the pivot axis 8. The leading edges 11 and 12 of the two halves 9 and 10 of the vortex sensing planar member 4 are offset from one another by a distance equal to one half of or a noninteger times the wave length of sinuating streamlines in the downstream of the bluff body, which are created by the vortices shed from the bluff body 3. A deflective portion of the vortex sensing planar member such as an extremity 13 is coupled to a force transmitting member 14 extending from a transducer container vessel 15 affixed to the flowmeter body 2. While the coupling between the extremity 13 and the force transmitting member 14 comprises a post and socket coupling in the particular illustrative embodiment, other flexible, elastic or rigid couplings may be employed in place thereof. It should be understood that the planar supporting member 5 extending from the leading edge 6 to the trailing edge 7 thereof may be replaced by two separate supporting members respectively equivalent to the leading edge 6 and the trailing edge 7.

Figure 2:
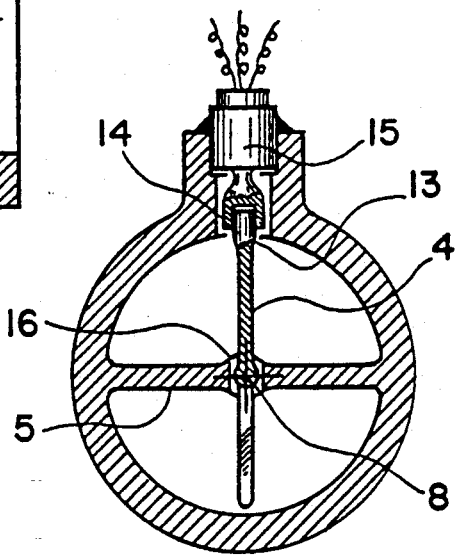
FIG. 2 illustrates another cross section of the embodiment shown in FIG. 1.

In FIG. 2 there is illustrated a another cross section of the vortex flowmeter shown in FIG. 1, which cross section is taken along plane 2—2 as shown in FIG. 1. The vortex sensing planar member 4 extends through the slotted opening 16 included in the planar supporting member 5 and supported thereby in a pivotable arrangement about the pivot axis 8.

Figure 3:
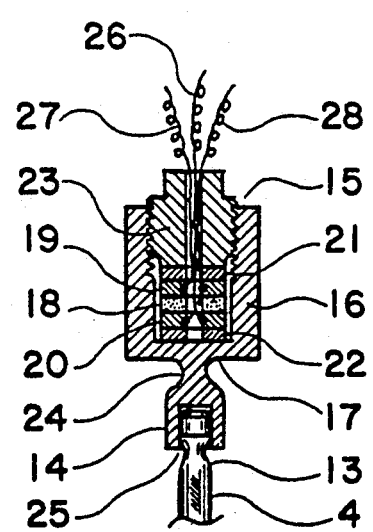
FIG. 3 illustrates a cross section of an embodiment of the transducer usable in conjunction with the balanced vortex sensor.

In FIG. 3 there is illustrated a cross section of an embodiment of the transducer container vessel 15 including a Piezo electric element, which cross section is taken along plane 2—2 as shown in FIG. 1. The transducer container vessel 15 having a rigid side wall 16 and a relatively thin end wall 17 contains a Piezo electric disc 18 sandwiched between two conductor discs 19 and 20, and two insulator discs 21 and 22, which stacked combination of the transducer assembly is pressed against the thin end wall 17 by a plug 23 threadedly engaging the open end of the transducer container vessel 15. The thin end wall 17 includes a reinforcing rib 18 disposed diametrically thereacross on a reference plane substantially parallel to the central axis of the flow passage. A force transmitting member 14 disposed coaxially to the Piezo electric disc 18 and anchored to the reinforcing rib 18 extends from the thin end wall 17. A deflective portion 13 of the vortex sensing planar member 4 is coupled to the force transmitting member 14 by a mechanical coupling such as a post and socket or ball and socket joint 25. Three lead wires 26, 27 and 28 extend from different electrodes included in the transducer assembly. It should be understood that other methods of mechanical coupling such as a threaded, pressure fitted or welded joint may be used in place of the particular mechanical joint. It must be mentioned that, while a transducer assembly working on principles of stress sensing such as the Piezo electric transducer is most preffered, other types of transducers such as the strain gauge, capacitive transducer, inductive transducer or fiber optic transducer detecting a stress or strain transmitted from the vortex sensing planar member 4 may be employed in place of the particular illustrative embodiment of the transducer shown in FIG. 3.

Figure 4:
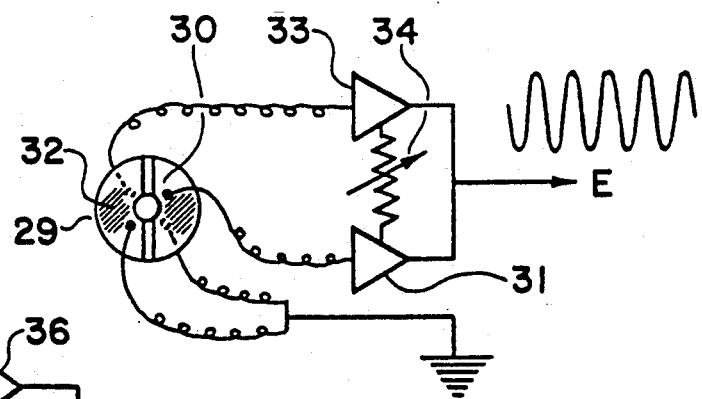
FIG. 4 illustrates an embodiment of a Piezo electric element employable in the transducer shown in FIG. 3, and signal conditioning circuit.

In FIG. 4 there is illustrated a plan view of an embodiment of the Piezo electric disc 18 usable in the construction of the transducer assembly shown in FIG. 3. Each side of the Piezo electric element 29 of a circular shape has a pair of electrodes located on the two opposite sides of the reference plane substantially including the reinforcing rib 24 shown in FIG. 3, which electrodes are under a pressurized contact with semicircular conductor plates making up the conductor discs 19 and 20 shown in FIG. 3. One electrode 30 located on one side of the Piezo electric element 29 and one side of the reference plane is connected to a first amplifier 31, while another electrode 32 located on the other side of the Piezo electric element 29 and the other side of the reference plane is connected to a second amplifier 33. There is a signal balancing means 34 that controls relative intensities of the outputs from the two amplifiers. The resultant output signal E is obtained by combining the two outputs from the two amplifiers 31 and 33. The other electrodes included in the Piezo electric element 29 and not connected to the amplifiers 31 and 33 are grounded.

The vortex flowmeter with balanced vortex sensor having a construction and components shown in FIGS. 1, 2, 3 and 4 operates on the following principles: The vortices shed from the vortex generating bluff body 3 produce sinuating streamlines in the downstream region. Since the leading edges 11 and 12 of the two halves 9 and 10 of the vortex sensing planar member 4 are offset from one another by one half of or a noninteger times the wave length of the sinuating streamlines, the two halves 9 and 10 of the vortex sensing planar member 4 experiences alternating lift forces of opposite signs. In other words, the vortices shed from the vortex generating bluff body 3 imposes an alternating torque about the pivot axis 8 on the vortex sensing planar member 4, which altenating torque generates an alternating electrical signal from the transducer assembly contained in the transducer container vessel 15, wherein the frequency thereof is proportional to the vortex shedding frequency. As the fluid velocity is linearly proportional to the vortex shedding frequency for Reynolds numbers greater than 1,000 and less than 400,000, and nonlinearly proportional for the Reynolds numbers less than 1,000, the fluid velocity is determined from the vortex shedding frequency so measured by using an empirically established mathematical relationship therebetween. The amplitude of the alternating lift force experienced by a vortex sensing planar member is generally proportional to the square of the fluid velocity for a well designed vortex sensor, and 1.5 to 3 powers of the fluid velocity in general for vortex sensors of inferior designs. The amplitude of an electromotive force generated by the transducer connected to the vortex sensing planar member is linearly or nonlinearly proportional to the dynamic pressure of the fluid flow, that is equal to one half of the fluid density times the square of the fluid velocity. As a consequence, the dynamic pressure of the fluid flow is determined from the amplitude of the alternating electrical signal generated by the transducer by using an empirically established mathematical relationship therebetween. In summary the volume flow rate of the fluid is determined from the frequency of the alternating electrical signal generated by the transducer and representing the alternating torque experienced by the vortex sensing planar member, and the mass flow rate is determined from a combination of the frequency and amplitude of the alternating electrical signal. The density of the fluid can be determined as a ratio of the mass flow rate to the volume flow rate. The minute torsional movement of the vortex sensing planar member 4 about the pivot axis 8, that is created by the sinuating streamlines produced by the vortices, alternatively compresses and decompresses the two opposite halves of the Piezo electric element 18 respectively located on the two opposite sides of the reference plane as shown in FIG. 3, which antisymmetric loading on the Piezo electric element generates the electrical signal representing the vortex shedding. The mechanical vibration of the vortex flowmeter body 2 in directions perpendicular to the central axis of the flow passage and parallel to the lengthwise axis of the bluff body 3 imposes symmetric loadings on the two opposite halves of the Piezo electric element 18. The electrical signal generated by such symmetric loadings are cancelled between the two amplifiers 31 and 33 by means of the signal balancing means 34 shown in FIG. 4. The mechanical vibrations in directions parallel to the central axis of the flow passage do not impose any net loading on the two halves of the Piezo electric element 18 and, consequently, does not generate any signals therefrom. The mechanical vibrations of the flowmeter body 2 in directions perpendicular to the central axis of the flow passage as well as to the lengthwise axis of the bluff body 3 produce very little pivoting movement of the vortex sensing planar member 4 about the pivot axis 8 because the mass distribution of the vortex sensing planar member 4 is balanced about the pivot axis 8 and, consequently, little electrical signal is generated thereby. In conclusion, the present invention teaches a vortex sensor that cancels or rejects all of the noise signals generated by the mechanical vibrations in all possible directions.

Figure 5:
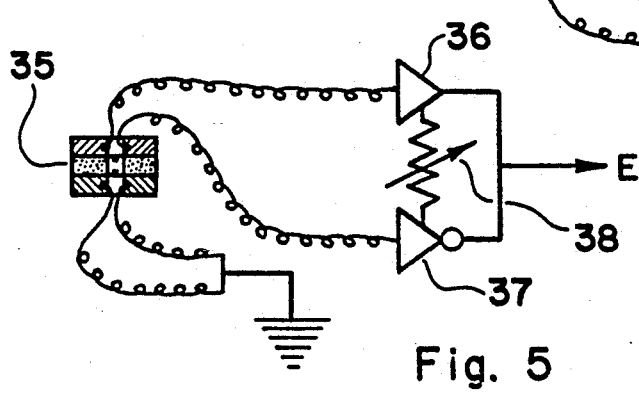
FIG. 5 illustrates another embodiment of a Piezo electric element employable in the transducer shown in FIG. 3, and signal conditioning circuit.

In FIG. 5, there is illustrated a cross section of another embodiment of the Piezo electric disc usable as the element 18 shown in FIG. 3. Each side of the Piezo electric element 35 has a pair of electrodes. A first pair of electrodes respectively located on the two opposite sides of the reference plane substantially including the reinforcing rib 24 shown in FIG. 3 and on the same side of the Piezo electric element 35 are respectively connected to a noninverting amplifier 36 and an inverting amplifier 37, which combination has a signal balancing means 38 for cancelling out noise generated by the mechanical vibrations. The other pair of the electrodes not connected to the amplifiers are grounded.

In FIG. 6 there is illustrated a plan view of a further embodiment of the Piezo electric element usable as the element 18 shown in FIG. 3. Each side of the Piezo electric element 39 has a middle electrode disposed intermediate two side electrodes located on the two opposite sides of the reference plane including the reinforcing rib 24 shown in FIG. 3. The first side electrode located on one side of the reference plane on one side of the Piezo electric element is connected to a first amplifier 40, while the second side electrode located on the other side of the reference plane on the other side of the Piezo electric element is connected to a second amplifier 41, wherein the two amplifiers 40 and 41 has a signal balancing means 42. Other side electrodes not connected to the amplifiers 40 and 41 are grounded. The two middle electrodes respectively disposed on the two opposite sides of the Piezo electric element 39 are connected to the two opposite terminals of an electric power supply 43 with a switching means 44, that supplies an input electric pulse of known amplitude $\Delta E_I$ across the two middle electrodes and produces a mechanical impulse across the two sides of the Piezo electric element 39, which mechanical impulse generates an output electric pulse of amplitude $\Delta E_O$ across the two side electrodes respectively connected to the two amplifiers 40 and 41. The ratio $\Delta E_I/\Delta E_O$ provides a calibration standard that can be used to determine accurately the amplitude of the alternating force generated by the vortex shedding from the amplitude of the alternating electrical signal E generated by the two side electrodes connected to the two amplifiers 40 and 41. For example, when the mathematical relationship between the amplitude $|F|$ of the vortex induced force to the amplitude $|E|$ of the electrical signal E obtained by an initial calibration of the vortex sensor is given by equation $$|F| = A \cdot |E|, \tag{1}$$

where A is a constant of proportionality determined by the initial calibration, the ratio $\Delta E_I/\Delta E_O$ intermittently obtained on a real time basis updates equation (1) in the following form $$|F| = A \cdot \left(\frac{\Delta E_I}{\Delta E_O}\right) \cdot |E|, \tag{2}$$

which equation accurately determines the amplitude of the vortex induced force $|F|$ from the amplitude of the electrical signal $|E|$ generated by the transducer independent of the aging, fatigue and other changes of the operating state of the Piezo electric element 39. It should be understood that the actual electric power supply 43 should be a pulse generator without any mechanical switches.

In FIG. 7 there is illustrated another embodiment of the balanced vortex sensor usable in the construction of the vortex flowmeter shown in FIGS. 1 and 2. The vortex sensing planar member 45 has round edges 46 and 47 having a diameter greater than the thickness of adjacent sections of the planar member, which are respectively disposed intermediate the offset leading and trailing edges of the planar vortex sensing member 45. A pair of planar supporting members 48 and 49 disposed perpendicular to the vortex sensing planar member 45 and anchored to the wall of the flow passage support the vortex sensing planar member 45 in a pivotable arrangement as a groove having a substantially circular cross section matched to the round edge 46 or 47 included in each of the planar supporting members 48 and 49 receives each of the round edges 46 and 47 in a pivotable and retaining relationship.

In FIG. 8 there is illustrated a cross section of the balanced vortex sensor 45 taken along plane 8—8 as shown in FIG. 7, which cross section shows the round edge 47 engaging a groove 50 included in the planar supporting member 49 in a pivotable and retaining relationship.

In FIG. 9 there is illustrated a further embodiment of the balanced vortex sensor 51 that has a pair of planar extensions 52 and 53 (invisible in the view shown) extending from a midsection of the vortex sensing planar member 51 in two opposite directions and anchored to the wall of the flow passage at their extremities.

In FIG. 10 there is illustrated another cross section of the balanced vortex sensor 51 taken along plane 10—10 as shown in FIG. 9. As the pair of lateral planar extensions 52 and 53 have a degree of flexibility, the vortex sensing planar member 51 is allowed to pivot over a minute angle about a pivot axis coinciding with the line of intersection between the vortex sensing planar member 51 and the pair of lateral planar extensions 52 and 53.

In FIG. 11 there is illustrated yet another embodiment of the balanced vortex sensor 54 with offset leading edges and offset trailing edges, that is supported by a pair of planar supporting members 55 and 56 disposed perpendicular to the vortex sensing planar member 54 and anchored to the wall of the flowpassage. A pair of slits respectively cut into the leading and trailing edges of the vortex sensing planar member 54 at the midsection thereof engages another pair of slits respectively cut into the trailing edge of the planar supporting member 55 and the leading edge of the planar supporting member 56 provide the pair of interlocking joints 57 and 58, which retain the vortex sensing planar member in position while allowing a pivoting movement of a minute amount about a pivot axis passing through the two interlocking joints 57 and 58.

In FIG. 12 there is illustrated a cross section of the balanced vortex sensor 54 taken along plane 12—12 as shown in FIG. 11, that shows the interlocking joint 58. The side edges of each of the notches in contact with a flat surface in the interlocking joints are rounded, whereby a pivoting movement of the vortex sensing planar member over a minute angle about the pivoting axis is facilitated.

Figure 13:
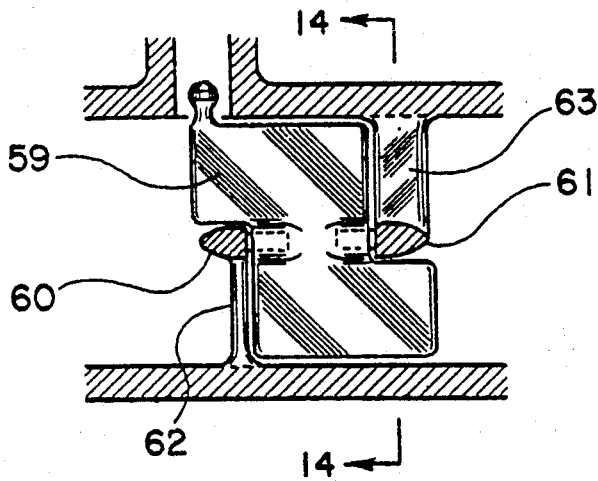
FIG. 13 illustrates yet a further embodiment of the balanced vortex sensor.

In FIG. 13 there is illustrated yet a further embodiment of the balanced vortex sensor that is supported by a pair of planar supporting members 60 and 61 disposed perpendicular to the vortex sensing planar member 59 and anchored to the wall of the flow passage, in a pivotable arrangement about a pivot axis passing through the midsection of the vortex sensing planar member 59 and parallel to the central axis of the flow passage. The leading edge side planar supporting member 60 has a slender bracing member 62 laterally extending from the midsection thereof and anchored to the wall of the flow passage, while the trailing edge side planar supporting member 61 has a planar bracing member 63 laterally extending from the midsection thereof and anchored to the wall of the flow passage.

Figure 14:
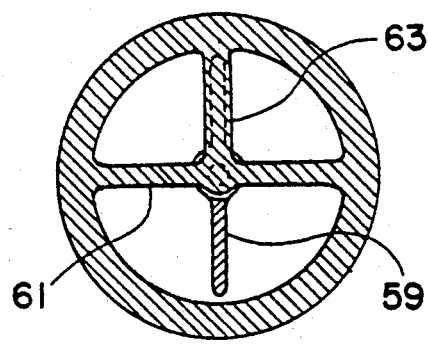
FIG. 14 illustrates a cross section of the embodiment shown in FIG. 13.

In FIG. 14 there is illustrated a cross section of the balanced vortex sensor 59 taken along plane 14—14 as shown in FIG. 13, which shows the trailing side planar supporting member 61 with lateral bracing member 63. The bracing member 62 of the leading edge side planar supporting member 60 must have a slender construction whereby the sinuating streamlines impacting on the vortex sensing planar member 59 is blocked by the bracing member 62. It should be mentioned that two bracing members may be added to a planar supporting member in such a way that the cross section of the supporting member has the shape of a cross with all four legs anchored to the wall of the flow passage. It should be further mentioned that the planar supporting members included in the embodiments shown in FIGS. 1, 7, and 11 may be provide with bracing members shown in or described in conjunction with FIGS. 13 and 14.

Figure 15:
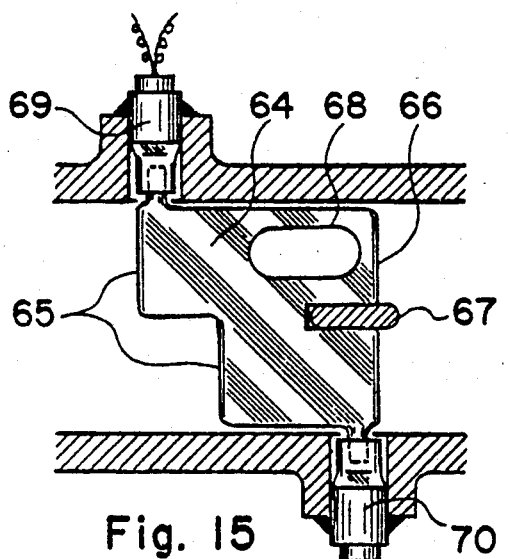
FIG. 15 illustrates still another embodiment of the balanced vortex sensor.

In FIG. 15 there is illustrated still another embodiment of the balanced vortex sensor 64 pivotably supported at the midsection thereof, that has an offset leading edge 65 and a straight trailing edge 66. A planar supporting member 67 engaging a slitted cut included in the trailing edge of the vortex sensing planar member 64 supports the vortex sensing planar member 64 in a pivotable arrangement about a pivot axis passing through the midsection of the vortex sensing planar member 64 and parallel to the central axis of the flow passage. A cut-out 68 is included in one half of the vortex sensing planar member 64, which half has a longer chord length compared with the other half, in order to balance the mass or inertia about the pivoting axis. A pair of transducer assemblies 69 and 70 are respectively connected to the two opposite extremities of the vortex sensing planar member 64. The two electrical signals respectively generated by the two transducer assemblies 69 and 70 are respectively supplied to the two amplifiers with a signal balancing means therebetween as shown in FIGS. 4 or 5, wherein the signals from the two amplifiers are combined in such a way that the noise is cancelled therebetween and a resultant signal representing the vortex shedding is obtained. It should be mentioned that the balanced vortex sensors shown in FIGS. 1, 7, 9, 11 and 13 may have a straight trailing edge instead of the offset trailing edge and a cut-out balancing the two halves of the vortex about the pivoting axis, and that they may have two transducer assemblies respectively connected to the two extremities of the vortex sensing planar member as shown in FIG. 15.

Figure 16:
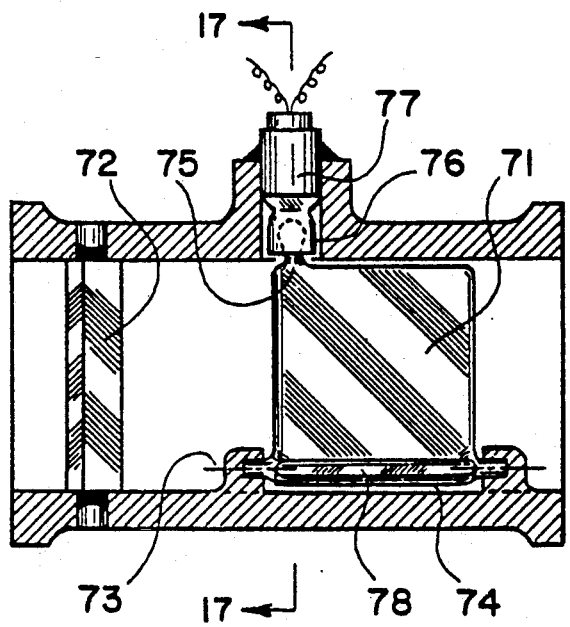
FIG. 16 illustrates still a further embodiment of the balanced vortex sensor.

In FIG. 16 there is illustrated still a further embodiment of the balanced vortex sensor 71 disposed downstream of the vortex generating bluff body 72. The vortex sensing planar member 71 is pivotably supported about a pivot axis 73 near one extremity of the vortex sensing planar member 71 and adjacent to the wall of the flow passage. The other extremity 75 of the vortex sensing planar member 71 is connected to the force transmitting member 76 extending from the transducer container vessel 77 affixed to the flowmeter body. As the over-whelmingly major portion of the side surface area of the vortex sensing planar member 71 belongs to a first portion intermediate the pivot axis 73 and the extremity 75, the fluid dynamic lift force created by the sinuating streamlines and exerted on the vortex sensing planar member 71 produces alternating torque about the pivot axis 73 and generates an alternating electrical signal from the transducer contained in the transducer container vessel 77 as described in conjunction with FIGS. 1, 2, 3 and 4. The second portion of the vortex sensing planar member 71 intermediate the pivot axis 73 and the extremity 74 has a counter balancing mass 78 that balances the vortex sensing planar member 71 about the pivot axis 73.

Figure 17:
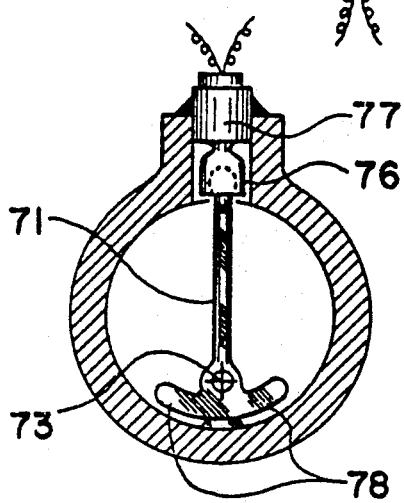
FIG. 17 illustrates a cross section of the embodiment shown in FIG. 16.

In FIG. 17 there is illustrated a cross section of the balanced vortex sensor 71 taken along plane 17—17 as shown in FIG. 17, which clearly shows the counter balancing mass 78 that balances the vortex sensing planar member 71 about the pivot axis 73.

Figure 18:
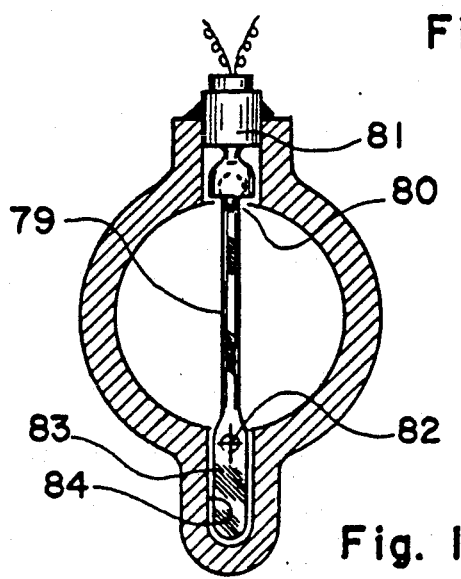
FIG. 18 illustrates a cross section of a revised version of the balanced vortex sensor shown in FIG. 17.

In FIG. 18 there is illustrated a cross section of a balanced vortex sensor 79, that is a modified version of the balanced vortex sensor 71 shown in FIGS. 16 and 17. The vortex sensing planar member 79 with one extremity 80 connected to the transducer 81 is supported in a pivotable arrangement about a pivot axis 82 at a section thereof adjacent to a portion of the flow passage wall diametrically opposite to the portion including the transducer 81. A counter balancing mass 83 of the vortex sensing planar member 79 disposed on the other side of the pivot axis opposite to one side including the fluid dynamic force receiving surface extends into a cavity 84 included in the flowmeter body. The embodiments shown in FIGS. 17 and 18 are suitable for flowmeters with small diameter flow passage, e.g., less than 1 inch, while those embodiments shown in FIGS. 1, 7, 9, 11, 14 and 15 are suitable for flowmeters with flow passage diameter equal to or greater than 1 inch.

While the principles of the present inventions have now been made clear by the illustrative embodiments, there will be many modifications of the structures, arrangements, proportions, elements and materials, which are obvious to those skilled in the art and particularly adapted to the specific working environments and operating conditions in the practice of the invention without departing from those principles. It is not desired to limit the invention to the particular illustrative embodiments shown and described and accordingly, all suitable modifications and equivalents may be regarded as falling within the scope of the invention as defined by the claims which follow.

The embodiments of the invention, in which an exclusive property or privilege is claimed, are defined as follows:

1. An apparatus for measuring flow rate of fluid comprising in combination:
   a) a body including a flow passage extending therethrough;
   b) a vortex generating bluff body of an elongated cylindrical shape disposed across a first cross section of the flow passage;
   c) a vortex sensing planar member disposed across a second cross section of the flow passage generally parallel to the vortex shedding bluff body on a plane generally parallel to the central axis of the flow passage and supported by at least one supporting member anchored to the body and extending at least partially across the flow passage in a pivotable arrangement allowing a pivoting movement over at least a minute angle about a pivot axis generally parallel to the central axis of the flow passage and disposed at a midsection of the vortex sensing planar member, wherein leading edge of two halves of the vortex sensing planar member respectively located on the two opposite sides of the pivot axis are offset from one another by a distance generally equal to a noninteger times the wave length of sinuating streamlines created by vortices shed from the vortex generating bluff body; and
   d) at least one transducer means connected to a deflective portion of the vortex sensing planar member for converting an alternating torque about the pivot axis produced by vortices shed from the vortex generating bluff body and experienced by the vortex sensing planar member to an alternating electrical signal.

2. A combination as set forth in claim 1 wherein volume flow rate of the fluid is determined from frequency of said alternating electrical signal.

3. A combination as set forth in claim 1 wherein mass flow rate of the fluid is determined from a combination of frequency and amplitude of said alternating electrical signal.

4. A combination as set forth in claim 3 wherein density of the fluid is determined from a ratio of the mass flow rate to volume flow rate of the fluid determined from the frequency of said alternating electrical signal.

5. A combination as set forth in claim 1 wherein said transducer means includes at least one Piezo electric element contained in a cavity of transducer container vessel and pressed against a thin wall of said cavity, wherein a force transmitting member extending from said thin wall is connected to said deflective portion of the vortex sensing planar member.

6. A combination as set forth in claim 5 wherein said combination includes a means for applying an input electrical pulse of known amplitude across said Piezo electric element and means for measuring an output electrical pulse from said Piezo electric element generated by said input electrical pulse, wherein ratio of the amplitude of said input electrical pulse to the amplitude of said output electrical pulse is used as a calibration standard in determining the amplitude of said alternating torque from the amplitude of said alternating electrical signal.

7. A combination as set forth in claim 1 wherein distribution of mass in the vortex sensing planar member is balanced about said pivot axis in such a way that structural vibrations of said body produces little torsional vibration of the vortex sensing planar member about said pivot axis.

8. A combination as set forth in claim 1 wherein said at least one transducer means is connected to one extremity of the vortex sensing planar member and another transducer means is connected to the other extremity of the vortex sensing planar member opposite to said one extremity, wherein alternating electrical signals from said at least one and another transducer means are combined in such a way that noise generated by structural vibrations of said body are cancelled therebetween and resultant signal representing vortex shedding from the vortex generating bluff body is obtained.

9. A combination as set forth in claim 1 wherein said supporting member comprises a pair of planar supporting members disposed generally perpendicular to the vortex sensing planar member and secured to the body, wherein said pair of planar supporting members respectively support a leading edge portion and a trailing edge portion of the vortex sensing planar member in a pivotable arrangement allowing a pivoting movement of the vortex sensing planar member about said pivot axis over at least a minute angle.

10. A combination as set forth in claim 1 wherein said supporting member comprises a pair of planar extensions respectively extending from a midsection of the vortex sensing planar member in two opposite directions generally perpendicular to the vortex sensing planar member and secured to said body at extremities thereof, wherein flexibility of said pair of extensions allows a pivoting movement of the vortex sensing planar member about said pivot axis over a minute angle.

11. A combination as set forth in claim 10 wherein said at least one transducer means is connected to one extremity of the vortex sensing planar member and another transducer means is connected to the other extremity of the vortex sensing planar member opposite to said one extremity, wherein alternating electrical signals from said at least one and another transducer means are combined in such a way that noise generated by structural vibrations of said body is cancelled therebetween and resultant signal representing vortex shedding from the vortex generating bluff body is obtained.

12. An apparatus for measuring flow rate of fluid comprising in combination:
   a) a body including a flow passage extending therethrough;
   b) a vortex generating bluff body of an elongated cylindrical shape disposed across a first cross section of the flow passage;
   c) a vortex sensing planar member disposed across a second cross section of the flow passage generally parallel to the vortex generating bluff body on a plane generally parallel to the central axis of the flow passage in a pivotable arrangement allowing a pivoting movement over at least a minute angle about a pivot axis generally parallel to the central axis of the flow passage, wherein a first portion of the vortex sensing planar member located on one side of of the pivot axis extends substantially across said second cross section of the flow passage and a second portion of the vortex sensing planar member located on the other side of the pivot axis opposite to said one side includes a counter balancing mass;
   d) at least one transducer means connected to a deflective portion of the vortex sensing planar member for converting an alternating torque about the pivot axis produced by vortices shed from the vortex generating bluff body and experienced by the vortex sensing planar member to an alternating electrical signal.

13. A combination as set forth in claim 12 wherein volume flow rate of the fluid is determined from frequency of said alternating electrical signal.

14. A combination as set forth in claim 12 wherein mass flow rate of the fluid is determined from a combination of frequency and amplitude of said alternating electrical signal.

15. A combination as set forth in claim 14 wherein density of the fluid is determined from a ratio of the mass flow rate to volume flow rate of the fluid determined from the frequency of said alternating electrical signal.

16. A combination as set forth in claim 12 wherein said transducer means includes at least one Piezo electric element contained in a cavity of transducer container vessel and pressed against a thin wall of said cavity, wherein a force transmitting member extending from said thin wall is connected to said deflective portion of the vortex sensing planar member.

17. A combination as set forth in claim 16 wherein said combination includes a means for applying an input electrical pulse of known amplitude across said Piezo electric element and means for measuring an output electrical pulse from said Piezo electric element generated by said input electrical pulse, wherein ratio of the amplitude of said input electrical pulse to the amplitude of said output electrical pulse is used as a calibration standard in determining the amplitude of said alternating torque from the amplitude of said alternating electrical signal.

18. A combination as set forth in claim 12 wherein distribution of mass in the vortex sensing palanr member is balanced about said pivot axis in such a way that structural vibrations of said body produces little torsional vibration of the vortex sensing planar member about said pivot axis.

19. A combination as set forth in claim 18 wherein said pivot axis is disposed adjacent to a portion of the wall of the flow passage diametrically opposite to said transducer means, and said second portion of the vortex sensing member includes a counter balancing mass laterally extending therefrom.

20. A combination as set forth in claim 18 wherein said second portion of the vortex sensing planar member includes a counter balancing mass disposed substantially in a cavity included in said body.

* * * * *